US010883477B2

(12) United States Patent
Kastrup et al.

(10) Patent No.: US 10,883,477 B2
(45) Date of Patent: Jan. 5, 2021

(54) LIFTING FRAME FOR A WIND TURBINE BLADE

(71) Applicant: Vestas Wind Systems A/S, Aarhus (DK)

(72) Inventors: Michael Kastrup, Ebeltoft (DK); Adrian Botwright, Sabro (DK); Troels Vahle, Grenaa (DK); Lucia Quintana, Aarhus (DK); Jacob Antonsen, Aarhus (DK); Martin Damm, Aarhus (DK); Kristoffer Lolk Fredriksen, Aarhus (DK)

(73) Assignee: Vestas Wind Systems A/S, Aarhus N. (DK)

( * ) Notice: Subject to any disclaimer, the term of this patent is extended or adjusted under 35 U.S.C. 154(b) by 238 days.

(21) Appl. No.: 16/066,439

(22) PCT Filed: Dec. 23, 2016

(86) PCT No.: PCT/DK2016/050465
§ 371 (c)(1),
(2) Date: Jun. 27, 2018

(87) PCT Pub. No.: WO2017/114531
PCT Pub. Date: Jul. 6, 2017

(65) Prior Publication Data
US 2019/0154005 A1 May 23, 2019

(30) Foreign Application Priority Data

Dec. 30, 2015 (GB) .................................... 1523126.9

(51) Int. Cl.
*F03D 13/40* (2016.01)
*B66C 1/10* (2006.01)

(52) U.S. Cl.
CPC .............. *F03D 13/40* (2016.05); *B66C 1/108* (2013.01); *F05B 2250/12* (2013.01); *F05B 2260/02* (2013.01); *Y02E 10/72* (2013.01)

(58) Field of Classification Search
CPC .. F03D 13/40; F05B 2250/12; F05B 2260/02; B66C 1/108
(Continued)

(56) References Cited

U.S. PATENT DOCUMENTS 3,734,308 A * 5/1973 Pasternack ................ B60P 7/13
410/80
4,221,515 A * 9/1980 Brown .................... B63B 25/24
410/32
(Continued)

FOREIGN PATENT DOCUMENTS

| CN | 1351572 A | 5/2002 |
| CN | 102795532 A | 11/2012 |

(Continued)

OTHER PUBLICATIONS

Japanese Patent Office, Notice of Reasons for Refusal in JP Application No. 2018-534857, dated Jun. 13, 2019.
(Continued)

*Primary Examiner* — Paul T Chin
(74) *Attorney, Agent, or Firm* — Wood Herron & Evans LLP

(57) ABSTRACT

Lifting yoke and method; the lifting yoke configured for connecting to, and lifting, a wind turbine blade transport frame, said yoke being generally rectangular and comprising four corner posts connected by struts; each corner post being configured for internally receiving therein an upwardly oriented locating finger atop a said transport frame shoulder; said corner post having a housing enclosing an internal space and extending between a lower foot face and a top;
(Continued)

said corner post having, at said lower foot face, an aperture dimensioned to receive a said locating finger into said internal space; said corner post further comprising guide surfaces enclosed within said housing and spaced apart to define a locking space and configured to snugly receive a said locating finger; each guide surface comprising a locking aperture; wherein a movable locking element is configured to engage both said locking apertures to thereby bridge said locking space; said locking element being configured to engage a lifting point at said locating finger; said movable locking element constituting the primary lifting element of said lifting yoke.

20 Claims, 8 Drawing Sheets

(58) Field of Classification Search
USPC ... 294/67.1, 82.19, 81.53, 81.1, 81.62, 81.6, 294/81.52
See application file for complete search history.

(56) References Cited

U.S. PATENT DOCUMENTS

| | | | | |
|---|---|---|---|---|
| 4,341,495 | A * | 7/1982 | Del'Acqua | B60P 7/132 |
| | | | | 220/1.5 |
| 5,022,546 | A | 6/1991 | Bock | |
| 5,052,734 | A * | 10/1991 | Hasegawa | B66C 1/663 |
| | | | | 294/81.2 |
| 5,163,726 | A * | 11/1992 | Boos | B66C 1/663 |
| | | | | 294/67.1 |
| 5,431,471 | A * | 7/1995 | Baumann | B66C 1/663 |
| | | | | 294/68.3 |
| 6,062,620 | A * | 5/2000 | Walker | B66C 1/28 |
| | | | | 294/67.31 |
| 6,135,524 | A | 10/2000 | Faller et al. | |
| 6,502,879 | B1 * | 1/2003 | Miyazawa | B66C 1/101 |
| | | | | 294/81.21 |
| 10,502,191 | B2 * | 12/2019 | Thomsen | F03D 13/40 |
| 10,641,248 | B2 * | 5/2020 | Thomsen | F03D 13/10 |
| 10,641,249 | B2 * | 5/2020 | Thomsen | B60P 3/40 |
| 2003/0175089 | A1 | 9/2003 | Almind | |
| 2004/0100111 | A1 * | 5/2004 | Stinis | B66C 1/663 |
| | | | | 294/81.21 |
| 2013/0216325 | A1 * | 8/2013 | Johnson | F03D 13/40 |
| | | | | 410/44 |
| 2018/0195497 | A1 * | 7/2018 | Neumann | F03D 13/40 |
| 2019/0010930 | A1 * | 1/2019 | Kastrup | B63B 25/28 |
| 2019/0024636 | A1 * | 1/2019 | Botwright | B65D 85/62 |
| 2019/0032639 | A1 * | 1/2019 | Thomsen | F03D 13/40 |

FOREIGN PATENT DOCUMENTS

| | | |
|---|---|---|
| CN | 103663168 A | 3/2014 |
| CN | 104066974 A | 9/2014 |
| CN | 203889893 U | 10/2014 |
| CN | 204224087 U | 3/2015 |
| CN | 204310686 U | 5/2015 |
| EP | 2424811 B1 | 3/2012 |
| EP | 2487363 A1 | 8/2012 |
| EP | 2796709 A1 | 10/2014 |
| GB | 968575 A | 9/1964 |
| GB | 2518847 A | 4/2015 |
| JP | H7291572 A | 11/1995 |
| JP | 2005162338 A | 6/2005 |
| JP | 5230683 B2 | 7/2013 |
| WO | 0069767 A1 | 11/2000 |
| WO | 2011093768 A1 | 8/2011 |
| WO | 2013175063 A1 | 11/2013 |

OTHER PUBLICATIONS

China National Intellectual Property Administration, First Notification of Office Action in CN Application No. 201680082702.6, dated May 29, 2019.
European Patent Office, Examination Report in EP Application No. 16826287.1, dated Apr. 4, 2019.
Intellectual Property Office, Search Report in GB1523126.9, dated Jul. 25, 2016.
European Patent Office, International Search Report and Written Opinion in PCT/DK2016/050465, dated Apr. 7, 2017.

* cited by examiner

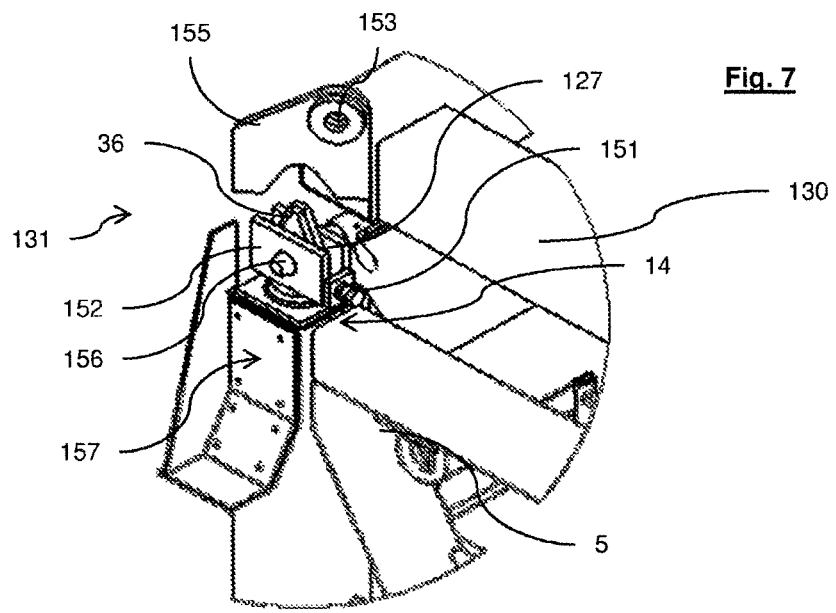
Fig. 7
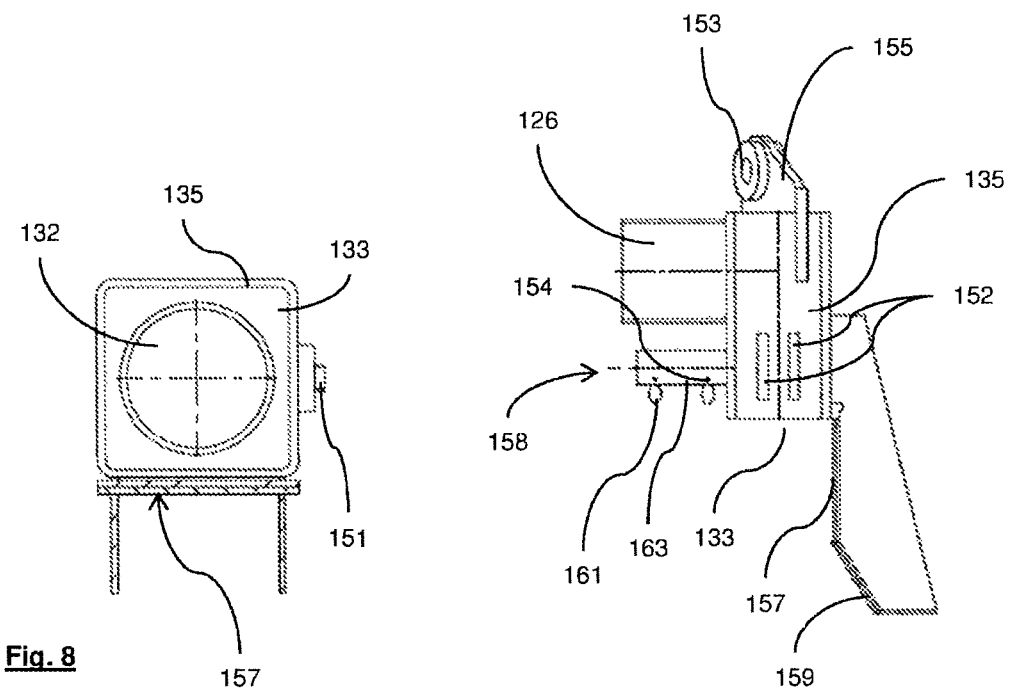
Fig. 8
Fig. 9

LIFTING FRAME FOR A WIND TURBINE BLADE

The present invention relates to the field of transportation and handling of large elongate objects such as, in particular wind turbine blades and transport frames therefor.

In this context, a special set of logistical requirements interacts with a wide variety of technical and cost constraints, to pose technical challenges for effective or optimal solutions. The ever-increasing size and weight of individual blades adds to these challenges. In general, it may be said that after their construction, wind turbine blades undergo a series of handling and storage stages from their production site to their installation location. These stages may include initial storage at a production site, transportation from a production site to an installation site or to an interim storage or marshalling site. There may be further transportation between one or more interim storage or marshalling sites to an installation site. Each interim storage stage may include transferring steps in which blades are lifted off a first transportation platform and on to another. One or more transport stages may include sea transport, or rail or truck transport. Storage and handling solutions are sometimes optimised for individual stages of the transition between production and installation. To that end, there may be provided a whole range of support or storage solutions, each individually configured for a particular storage or transport stage and requiring repeated switching between different storage or transport structures. This is costly, time-consuming and can increase the tendency to inflict damage or wear on blades. There can be many advantages arising from devising a blade handling solution which facilitates multiple stages of the transportation process as a whole, including interim storage stages.

The present invention seeks to provide an effective wind turbine blade transport and handling solution which addresses the needs to ensure damage-free transportation of the blades, and combining quick handling during transfers whether between transport platforms or between storage and transportation stages, as well as safety and ease of use by personnel. In aspects, special consideration has been given towards transportation by shipping. In aspects, special consideration has been given towards both ensuring secure retention and support of blades in transport frames, and to simplifying operations and procedures such as lifting operations, in particular, lifting operations of blade transport frames and stacks of such frames.

Wind turbine blade support and transportation devices are known in which a frame element is applied at a blade root while another co-operating frame element is provided outboard of a blade root region, often in a mid- or tip region. These may be referred to as root- and tip frames respectively. In some cases, these may be stackable thereby allowing several blades to be supported lying more or less horizontal or slightly inclined, and stacked atop one another. EP2708731 recites stackable wind turbine blade frames in which each frame is provided at its upper and lower corners with ISO container corner castings. These ensure that the transport frames can be lifted. Moreover, it is known in the art to stack containers atop one-another, in particular using twistlock elements interposed between adjacent corner castings in a stack. EP2796709 discloses transport and storage fittings for a wind turbine blade with a set of root and tip storage fittings for storing a blade in one pitch orientation. The frames may be stacked atop one another with the help of locating mountings. According to that document, lifting of a transport frame is by means of a crane sling shackled to additionally provided lifting eyelets.

It would be desirable to provide a transport frame design which would enable quick and easy lifting operations. It would be desirable to improve lifting operations while at the same time ensuring secure transportation in a stacked arrangement, especially during shipping. Furthermore, it would be desirable to enable lifting of multiple blades in a stack. It would be especially desirable to provide such a solution for use in connection with larger blades, especially offshore blades. It has previously been suggested in EP2487363 to lift a stack of blades as a pack by lifting them from beneath.

The present invention may provide improvements to known blade transport frame lifting equipment and known blade transport frame interconnection elements, with a view in particular to ensuring easy usage by operators, quick and reliable stacking and lifting in a stacked configuration as well as a simplified arrangement for lifting blades in a stack.

SUMMARY OF THE INVENTION

To these and other ends, the present invention provides a transport frame as defined in appended claim 1. Further optional features thereof are defined in appended claims 2-11 and are in particular described in the present specification and drawings.

Accordingly, there is provided al lifting yoke configured for connecting to, and lifting, a wind turbine blade transport frame, said yoke being generally rectangular and comprising four corner posts which may preferably be rigidly connected together by two lengthways struts and two lateral struts. Each corner post is configured for internally receiving therein an upwardly oriented locating finger atop a transport frame shoulder. The corner post has a housing, which may be an outer housing, enclosing an internal space and extending between a lower foot face and a top. The corner post has, at said lower foot face, an aperture dimensioned to receive a locating finger into the internal space. The corner post further comprises guide surfaces, which may be in particular configured on respective guide plates. These guide surfaces are enclosed within the housing and are spaced apart to thereby define a locking space between them. The guide surfaces are configured to snugly receive a said locating finger on a transport frame shoulder portion. Each guide surface comprises a mutually opposing locking aperture, preferably aligned such that a common axis passes through both apertures. Furthermore, a movable locking element is configured to reciprocally engage both locking apertures in the said guide surfaces to thereby bridge the locking space. Moreover, the locking element is configured to engage a lifting point at the locating finger, and the movable locking element constitutes the primary lifting element of the lifting yoke. The guide surfaces may be provided on guide plates which may be rigidly secured within the corner post housing. Guide plates and thereby guide surfaces may in particular be parallel or substantially parallel. The locking space may be conformed to snugly receive a tongue shaped locating finger.

The arrangement according to the invention is easy to construct and easy to use as well as being effective for lifting heavy loads such as wind turbine blades in transport frames, and possibly stacked blades. The lifting yoke of the present invention is thereby effective and easy to use as can be additionally seen from aspects of the detailed description below. A lifting yoke according to the invention utilises a lifting technique in which it is simply placed atop a blade frame which may be the top frame in a stack, secured to the top frame, and then raised, allowing the possibility of taking the entire stack with it. It is releasable after lifting to leave a frame or stack as it was prior, albeit possibly on a different platform. The yoke of the invention offers simplicity by needing only to interact with the top frame. As may be better understood from a perusal of this disclosure, one benefit of the present system for lifting blade frames may reside in the usefulness of the locating fingers for both stacking and for lifting operations. In particular, the design of the lifting yoke such that it co-operates with a lifting point in a locating finger for stacking, avoids complexity.

Optionally, the yoke may be comprised of struts, preferably comprising two respective lengthways and two lateral struts. Respective lengthways and lateral directions in the present context correspond to longitudinal and lateral directions of a wind turbine blade received in a corresponding transport frame.

Preferably, a portion of the movable locking element may be received in a passage which extends at least partly outside the internal space or outside said housing. In particular, it is provided that an operator may easily have access to the locking element. Moreover, the movable locking element may preferably be reciprocably movable between a locking and a release position by an operator preferably manually and without the use of power tools. Preferably, the locking element may be a sliding bolt. Preferably, the sliding bolt is manually operable by an operator, preferably by means of a bolt handle. Preferably, the sliding bolt may be received in a longitudinal sleeve. Preferably the sleeve may have longitudinal slot. Preferably the bolt handle may be slidably received in the longitudinal slot. Preferably the longitudinal slot may communicate with transverse slots, also dimensioned to slidably receive the bolt handle. Preferably, transverse slots may be positioned to for blocking longitudinal movement of the bolt handle, and thereby for blocking longitudinal movement of the bolt, or equivalent locking element. Preferably, lateral slots may be positioned at locations on the bolt sleeve corresponding to a locked condition and to a retracted condition of said bolt. Preferably said sleeve and said bolt may be configured with through holes allowing insertion of a split pin to lock said bolt in a retracted or in a locked position.

Advantageously, the locking space may further include an adjustably movable reference surface therein, configured to abut with an edge of the transport frame locating finger. Optionally, the movable reference surface may be a part of an adjuster or it may be a separate movable surface driven by an adjuster. In embodiments, the reference surface may be the end of a threaded shaft. In embodiments, the adjuster may be accessible from outside the corner post housing. In embodiments, the adjuster may be operated by an operator, in particular by hand, to move the reference surface inside the locking space. In embodiments, an operator may operate the adjuster to align locking apertures in the said guide surfaces, with a lifting aperture in said locating finger.

Optionally, one or more—preferably two or three or each one—of the corner posts may include a locating skirt downwardly dependent therefrom and configured with a reference surface designed to rest against a flank of a said transport frame shoulder. The downwardly dependent reference surface may be configured with the transport frame in mind, in particular, a perpendicular distance between a flank of a shoulder at a transport frame and a locating finger thereon may correspond to a perpendicular distance between a plane of said reference surface at said skirt and a guide surface inside said corner post. In this way, by simply placing a said reference surface at said skirt on a flank of a transport frame shoulder, the relevant corner post may be thereby pre-aligned for snug engagement between said guide surfaces and a said locating finger. Preferably, a lifting yoke may comprise two or three or more said downwardly depending reference surfaces in order to pre-align all corner posts simultaneously before lowering a lifting yoke onto a transport frame.

In alternative embodiments, instead of using a downwardly depending skirt as an aid to alignment, there may be provided at said transport frame, locating fingers which extend to different heights, in particular to different heights above same-height shoulder surfaces at respective top corners of said transport frame. In particular, a first said locating finger may have a height greater than each of the three remaining said locating fingers. Additionally, a second locating finger may have a height less than said first locating finger, and greater than each of two remaining said locating fingers. An alignment method of a lifting yoke in this case may include bringing a first locating finger of a transport frame into engagement with a first aperture at a foot of a first corner post of said yoke and thereafter bringing remaining locating fingers of said transport frame into engagement with remaining apertures at a foot of each remaining second, third and fourth corner post of the yoke. Alternatively, an alignment method of a lifting yoke may include bringing a first locating finger of a transport frame into engagement with a first aperture at a foot of a first corner post of said yoke and thereafter bringing a second locating finger of a transport frame into engagement with a second aperture at a foot of a second corner post, preferably diagonally opposite from said first corner post of said yoke, and then bringing remaining locating fingers of said transport frame into engagement with remaining apertures at a foot of each remaining third and fourth corner post of the yoke.

Optionally, a reference surface of a locating skirt may have a lowermost outwardly flared portion. The designation "outward" in this sense may refer to a direction outward from a centre of a yoke frame. This may simplify the task of locating a yoke reference surface against a transport frame. In particular, where two or more downward reference surfaces are provided at respective corners of a lifting yoke, especially where these surfaces are facing each other from opposite sides of a lifting yoke, then the locating task may be greatly simplified.

Optionally, the top of each corner post, in particular an external surface thereof, may comprise a, ring-shaped lifting eye in particular configured for connection to lifting rigging attachable to e.g. a crane. The lifting eye may be provided in, on or at a substantially planar eye plate. Each said eye plate may preferably lie in a respective plane, wherein an imaginary, common intersection of all of the respective planes coincides with a central region within the yoke. In this way, when an arm of a multi-armed lifting sling would be passed through the each of the relevant lifting eyes, then a central lifting connector, to which each sling arm would be attached, would pull on each respective lifting eye substantially in the plane of each of the eye-plates. In embodiments, it may be preferred for all the planes containing the respective eye plates to intersect at a central region within said lifting yoke frame at a location more towards one side of the frame than the other. In this way, a central lifting connector to which all sling arms may be connected for lifting may lie vertically above the yoke frame at a central location slightly off-centre in one or more directions. Preferably, the off-centre location of a lifting connector may be more towards one lateral side of the yoke than the other. Alternatively, or additionally, the off-centre location of a lifting connector may be more towards one longitudinal side of the yoke than the other. This arrangement may ensure on the one hand a good alignment between lifting forces and intrinsic resilience of lifting eyes. On the other hand, it may compensate for an uneven distribution of weight of wind turbine blades when positioned in respective root and tip frames. In particular, it may be important to ensure that a lifting yoke remains substantially horizontal during a lifting operation in order to avoid putting stresses on a blade frame or on a blade therein. An uneven weight distribution, as mentioned, would tend to pull the lifting yoke away from its horizontal orientation unless pre-compensated by equipping a lifting sling such that its arms, extending from a central lifting connector, have different lengths, possibly pre-adapted.

Hence, preferably, in embodiments, each eye plate may lie in a respective plane, an imaginary, common intersection of all of which coincides with an off-centre location within a central region within said yoke.

Furthermore, in embodiments, the lifting yoke may therefore additionally comprise a lifting sling having four centrally connected branches, each one being releasably attachable to a respective said corner post, each said branch having an effective length between said central connection and a corner post connector; and wherein two said branches have a shorter effective length than the other two. In particular, a first two said branches may have a matching or substantially matching length, which is greater than the length of a second two of said branches. Alternatively, each said branch may have a moderately different length from all the others.

The present invention also encompasses a method as defined in appended claim 12. Further features thereof are defined in appended claims 13-16 and are also further described herein.

Accordingly, there may be provided a method of lifting a wind turbine blade transport frame, by means of the lifting yoke set forth hereinabove. According to the method, the wind turbine blade transport frame may in particular have a longitudinal, lateral and upright extent, and may comprise four upright frame struts which together define a generally cuboid internal space having a longitudinal extent between two pairs of upright strut. The frame is in particular configured for transporting a root end or tip portion of a longitudinally extending wind turbine blade, and the frame is stackable with similar or identical frames. The frame further has four top shoulders and four feet, its feet being conformed to be stackable on corresponding shoulders of another similar frame, wherein each shoulder is provided with a locating finger, each finger having a height above said shoulder, and wherein each said foot is provided with a recess conformed to receive a said locating finger, and wherein each said finger is provided with a lifting aperture configured as a load bearing lifting point for lifting a said frame or a stack of said frames; the method including aligning the four corner posts of the lifting yoke with the locating fingers and receiving each locating finger within the locking space in a respective corner post; and actuating respective said locking mechanisms to engage said locating fingers through respective said lifting apertures; and lifting a first said frame by means of said lifting yoke suspended from a lifting apparatus.

According to embodiments, the method may further include lifting a stack of said frames by suspending a second or third or more said frame below said first frame, each said frame being suspended from the one immediately above it. This may allow a much faster than customary movement of stacked blades, e.g. in a transfer of stacked blades onto or off from a transport platform. The lifting yoke ensures that only the topmost frame needs to be grasped and it provides a lifting connection secure enough to suspend all blades and frames in a stack.

Optionally, each transport frame may further comprise a retractable arm assembly proximate one or more top or bottom corner thereof. It may further comprise a clamping claw arrangement proximate at least one top or bottom corner thereof. The retractable arm assembly may thereby fixingly engage a corresponding claw arrangement at an adjacent frame in the stack. The second or third or more frames below said first frame are each suspended from the frame immediately above by the retractable arm and clamping claw arrangement.

In this context, a retractable arm assembly and a clamping claw arrangement may constitute a stacked transport frame connector. Other types of stacked connector may be envisages for interconnecting adjacent frames in a stack.

Advantageously, the method may further include aligning the locking apertures in the guide surfaces with a lifting aperture in the locating finger, by adjusting the position of a movable reference surface in the locking space.

The method may furthermore optionally include aligning the corner posts of the lifting yoke with the locating fingers of a transport frame by first bringing a reference surface depending from a the corner post into engagement with a flank of a shoulder of the transport frame.

Still further advantageously, there may be provided a method of lifting a wind turbine blade frame or stack of said frames as set forth hereinabove and wherein in particular the frame may comprise a wind turbine blade. The method may include connecting a lifting element to two or more load bearing lifting apertures at a locating finger and lifting the frame or stack of frames suspended by the load bearing lifting apertures.

Additional aspects of the invention including various optional features thereof will be explained with reference to the following non-limiting examples including the following drawings in which.

Figures 5A, 5B:
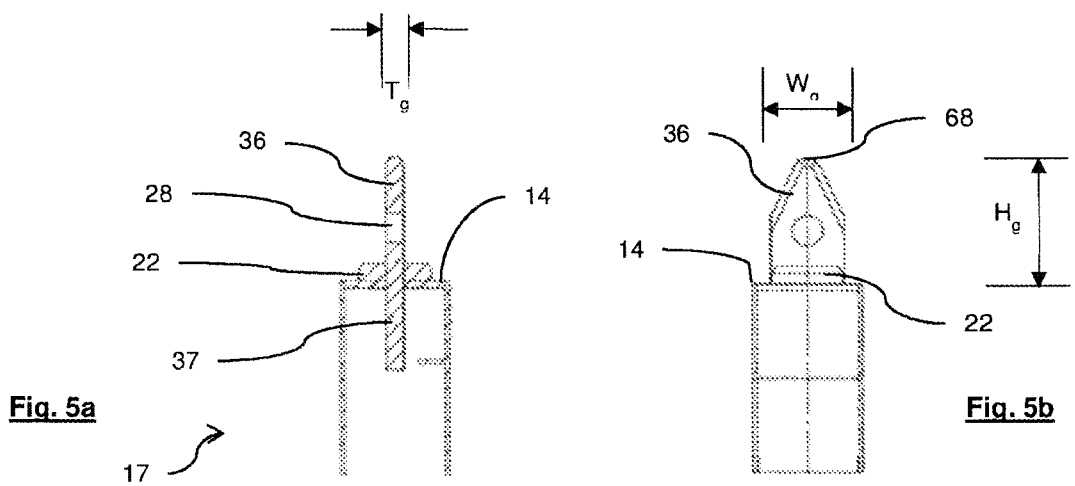
Figure 6:
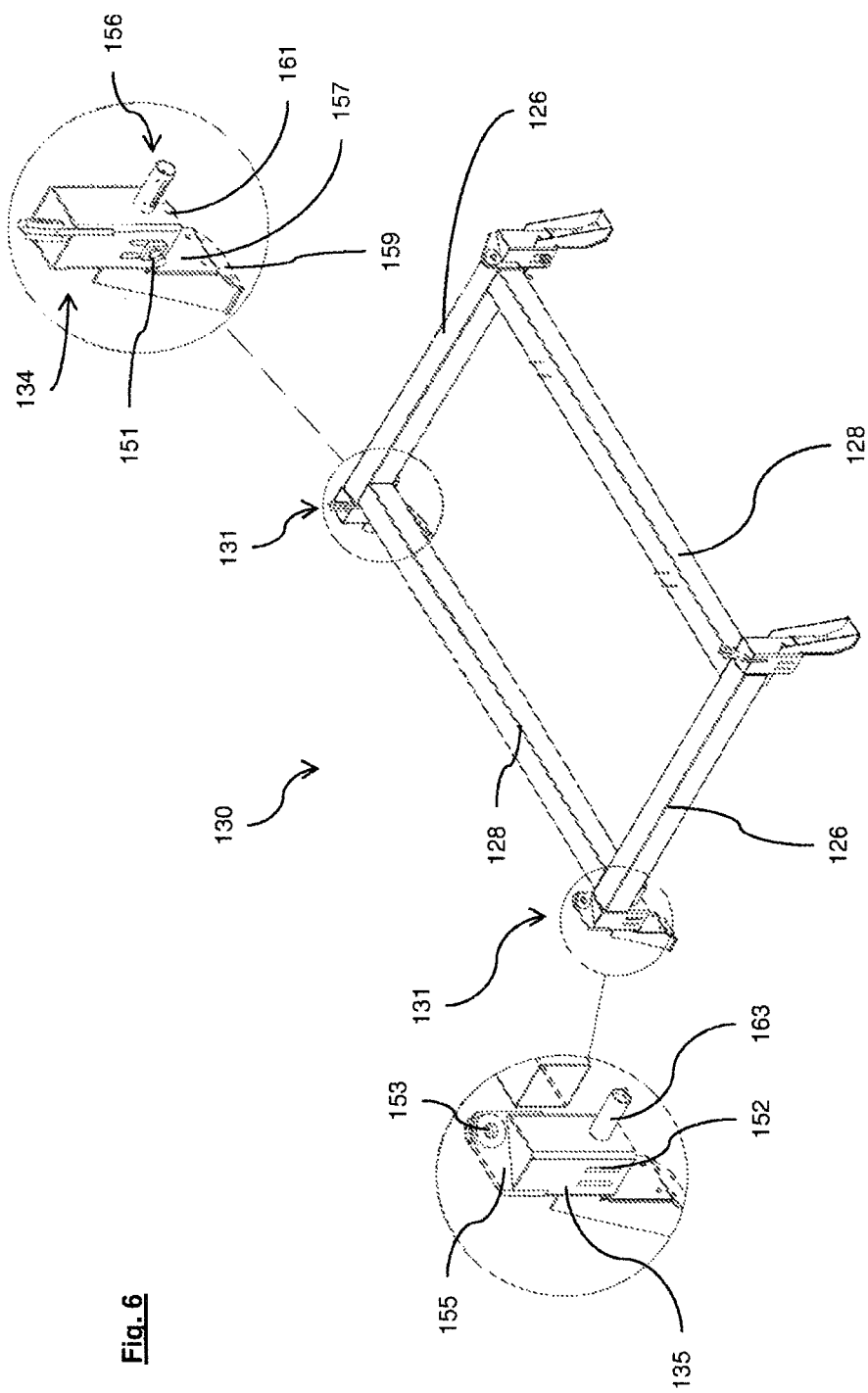
Figure 10A:
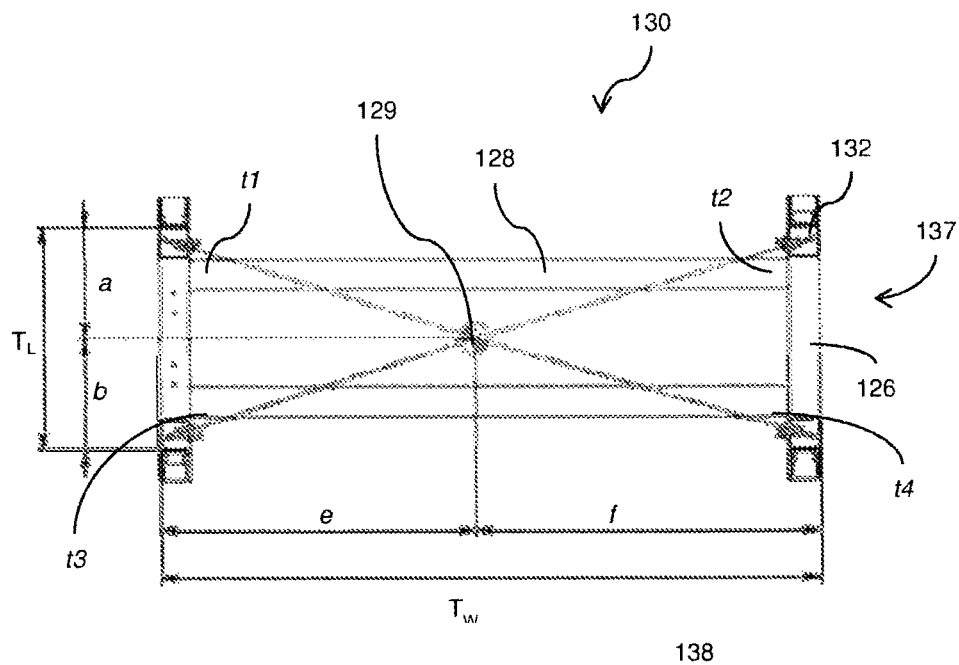
Figure 10B:
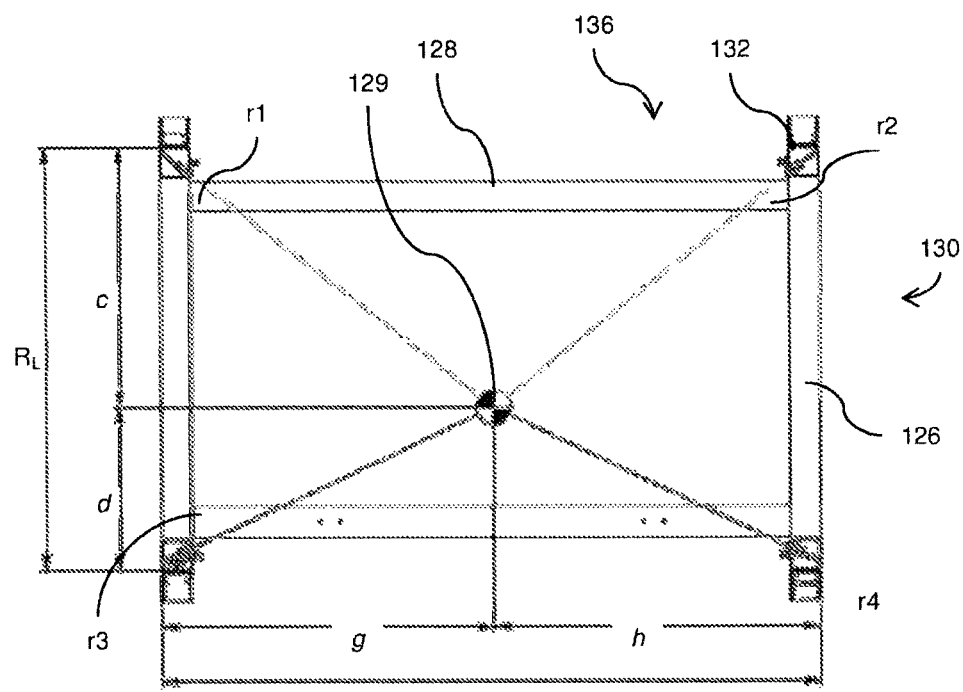
Figure 11:
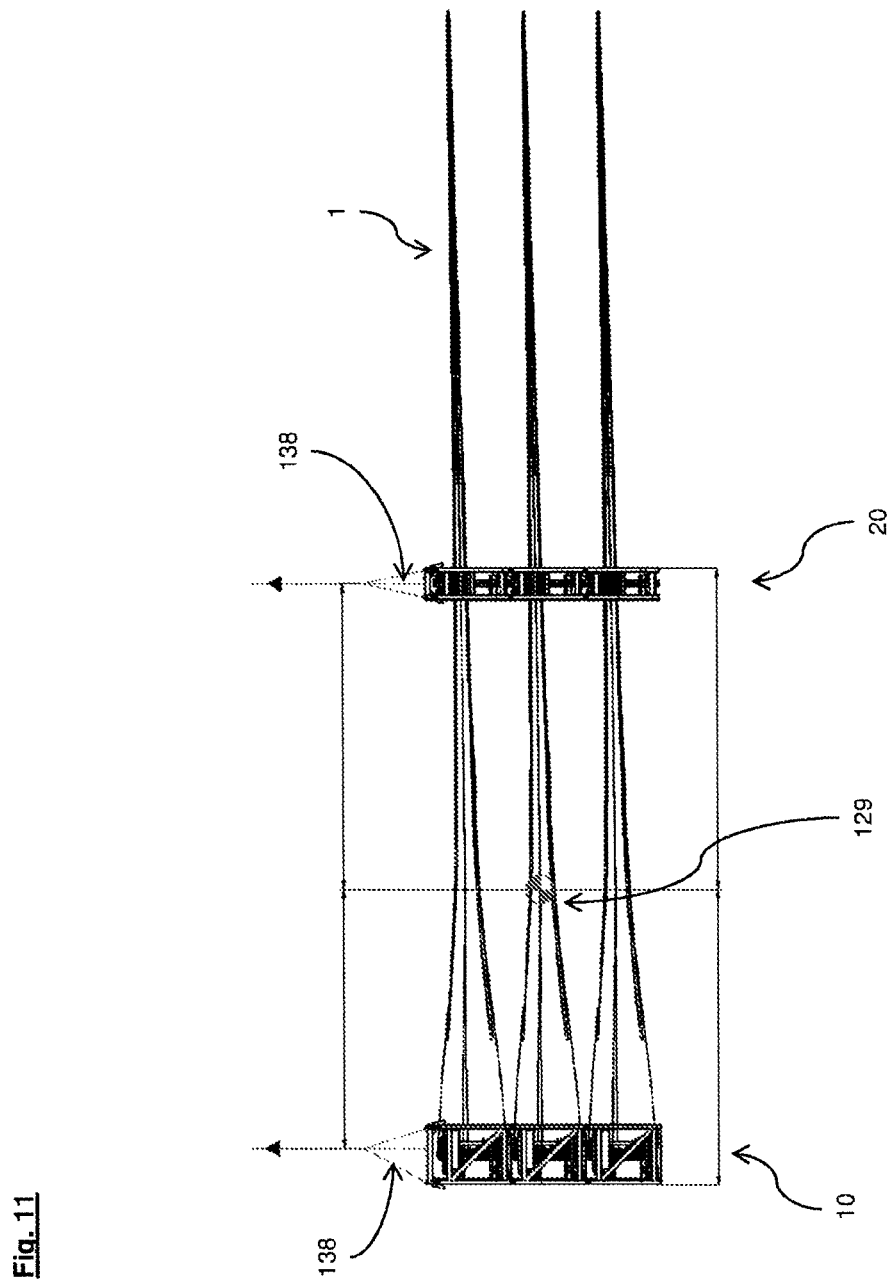
Figure 12:
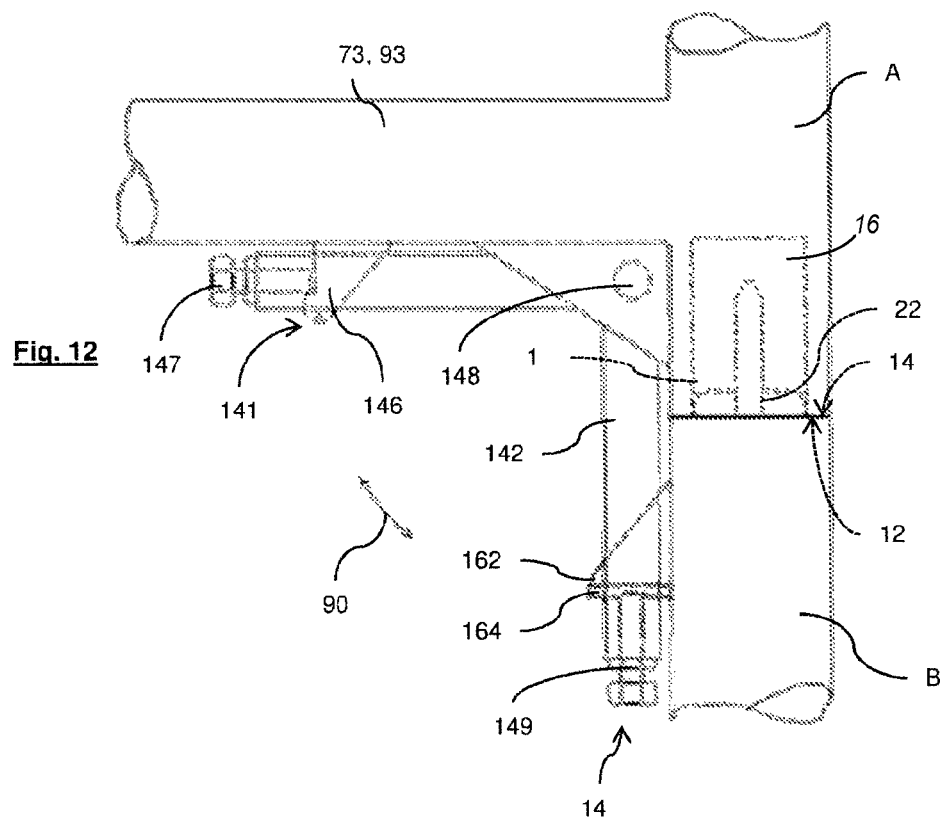
Figure 13:
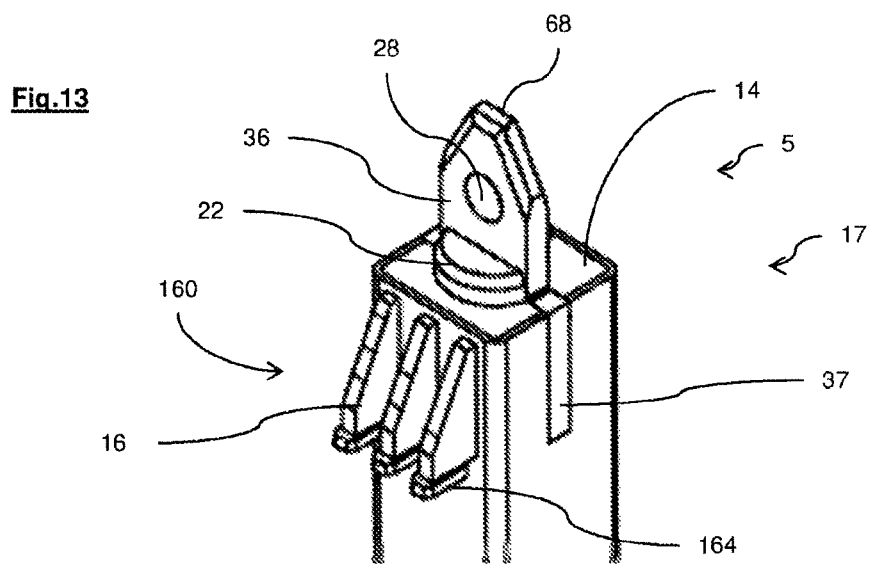

FIG. 5*a* shows a section view through a top corner of a frame;

FIG. 5*b* shows a front view of some features at a top corner of a frame;

FIG. 6 shows a perspective view of a blade frame lifting yoke;

FIG. 7 shows details of a corner post of a lifting yoke;

FIG. 8 shows a detail of a yoke corner post aperture;

FIG. 9 is a side view showing some details at a of a yoke corner post;

FIGS. 10*a* and 10*b* are plan views showing aspects of a lifting yoke geometry;

FIG. 11 shows aspects of blade stack lifting geometry;

FIG. 12 shows a figurative illustration of blade frame stacking connectors;

FIG. 13 shows a perspective cutaway view of a blade frame shoulder.

Figure 1:
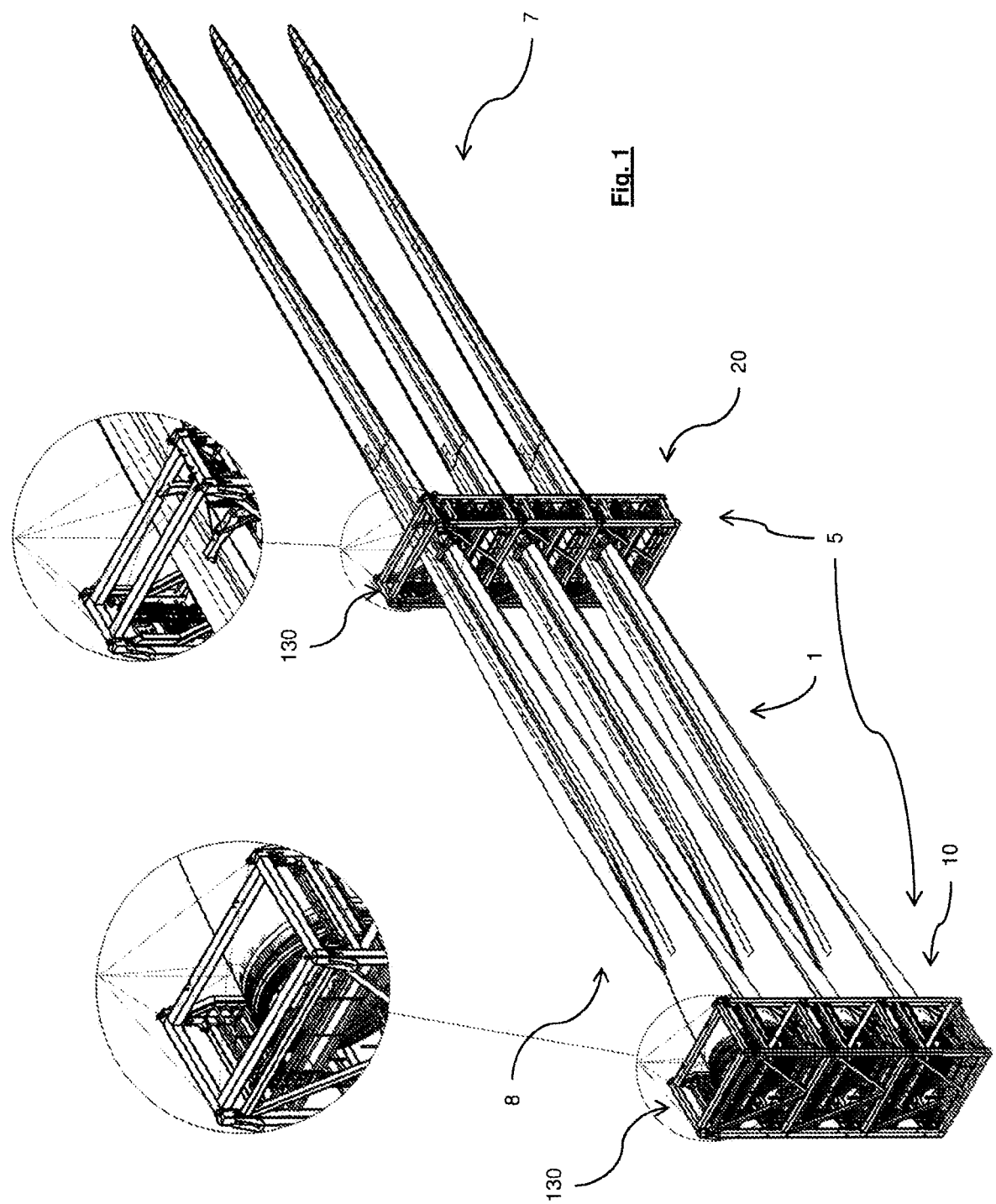
FIG. 1 shows a lifting arrangement for stacked transport frame pairs supporting wind turbine blades.

FIG. 1 illustrates a stacked set of wind turbine blade transport frame pairs, each pair consisting of a transport frame 5 in the form of a root frame 10 and a transport frame 5 in the form of a tip frame 20. A wind turbine blade 1 is supported in each frame pair in a generally horizontal orientation. A chordwise direction of the blade 1 may also lie generally horizontal when supported in the respective transport frames 5. As is generally understood, the blade 1 extends from a root end to a tip end which may also be correspondingly referred to as a proximal and a distal end respectively. The frames of the frame pair are stackable, as illustrated. Each root and tip frame 10, 20 includes a respective root saddle assembly 80 and tip saddle assembly 50 as will be described more fully below. In the design illustrated here, each tip and root frame includes a single respective tip- or root saddle assembly 50, 80. Associated with the respective saddle assembly are additional elements for keeping the respective blade root region 8 or tip region 7 securely in place in the respective frame 10, 20. For the purposes of the present context, the tip region 7 may also denote a mid-region of a blade 1. Expressed differently, a tip frame 20 may be positioned anywhere between a mid- and a tip-region 7 of a blade 1.

In the multiple stacked blade arrangement shown in FIG. 1, each blade is supported in a frame pair 10, 20. The stacked arrangement is achieved by stacking the respective root frames 10 on top of each other and the tip frames 20 likewise. To that end, each of the tip frames 20 and root frames 10 is constructed accordingly, as can be seen for example from FIGS. 2 and 4. Preferably, the frame construction in each case includes rigidly connected frame struts, including upright struts 71, 72, 91, 92 extending between a respective root or tip frame base 75, 95 and a respective root or tip frame top 76, 96. Preferably, these respective upright struts 71, 72, 91, 92 may define respective upright extending corner edges of each transport frame 5, extending between respective corners 17. Preferably therefore, respective upright struts may be provided in pairs of proximal upright struts 71, 91 and distal upright struts 72, 92. Lateral struts 74, 94 extend rigidly between upright struts 71, 91, 72, 92, thereby define a respective proximal frame portion and a distal frame portion. Lengthwise struts 73, 93 longitudinally connect respective proximal and distal frame portions. In the example illustrated, lengthwise struts 73, 93 extend between proximal upright struts 71, 91 and distal upright struts 72, 92 or between respective proximal and distal lateral struts 74. The respective frame struts of the tip or root frame 20, 10 thereby define a three dimensional interior space. In the example illustrated here, the tip- and root frame 20, 10 each defines an approximately cuboid interior space inside which a respective tip saddle assembly 50 or root saddle assembly 80 is accommodated. The base 75, 95 of the tip and root frames 20, 10 may describe a substantially rectangular footprint in a lateral and longitudinal plane of the frame.

Figure 3:
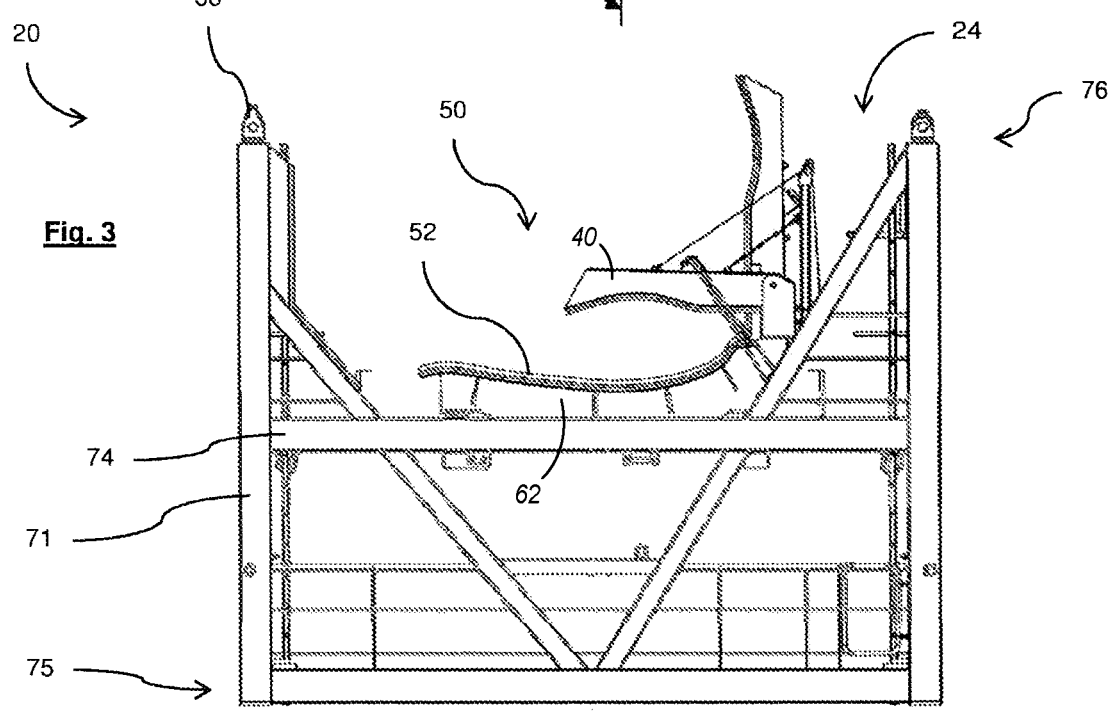
FIG. 3 shows a side view of a transport frame which is a tip frame.

As can be seen from the tip frame 20 illustrated in FIG. 3 and the root frame 10 illustrated in FIG. 5, each frame exhibits a height extent H, a lateral extent W and a lengthwise extent L.

At the top 76, 96 of each tip or root frame 20, 10 there may be provided locating fingers 36 which may co-operate with a recess (not visible in these drawings) at the bottom 75, 95 of the relevant frame. Necessarily, a recess or finger 36 of a first tip or root frame 20, 10 will co-operate to facilitate stacking with the corresponding finger 36 or recess of a similar frame to be stacked atop or beneath. In this context, a recess 16 may be in the form of an aperture.

Stacking frames for storage or stowage, as well as transferring frames off from stacks or onto stacks can be made easier when the effective height dimension $H_t$ of the tip frame 20 of a frame pair is equal to or substantially equal to the effective height $H_r$ of the root frame 10. In this context, the effective height of a frame may correspond to be the distance from a contact surface beneath the frame base 75, 95 on which the frame may rest in e.g. a storage or stowage or transport situation, to the frame top 76, 96, on which a superposed, stacked frame will rest. Preferably, also the effective width dimension $W_t$ of the tip frame 20 of a frame pair may be equal to or substantially equal to the effective width $W_r$ of the root frame 10. In the present context, the effective width of a frame 5 may correspond to the distance between the outermost surface of a proximal 72, 92 or distal 71, 91 pair of upright struts.

Figure 4:
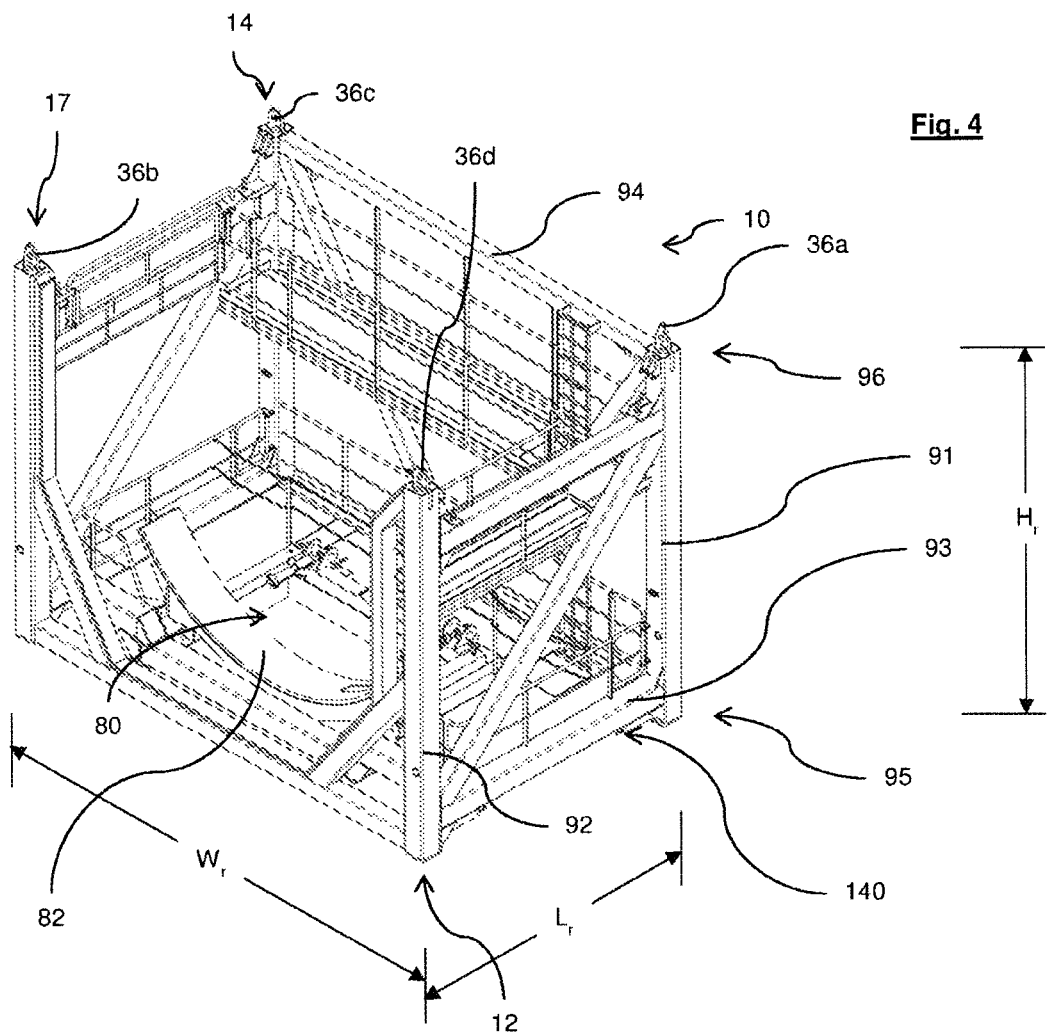
FIG. 4 shows a perspective view of a root frame.

FIGS. 3 and 4 show a tip saddle assembly 50 within tip frame 20. The tip saddle assembly 50 preferably comprises a saddle 52 on a saddle support 62. The tip saddle 52 may be configured with a support surface shaped to conform to the shape of a blade surface towards its tip, e.g. in a mid- or tip region thereof. In the illustrated embodiments, the tip saddle is configured to extend between a blade trailing edge 3 and a blade leading edge 2. As can better be seen from FIG. 3, the tip saddle assembly 50 may be supported on longitudinally extending frame struts 73. In particular, a tip saddle support may be supported on longitudinally extending frame struts 73.

Also shown in FIGS. 3-4 are clamping arms 40 for securing the blade mid- or tip-end on the tip saddle 52 in the tip saddle assembly 50. According to aspects of the invention, one or more such clamping arms 40 may be provided in connection with a tip saddle assembly 50, in particular as part thereof. In the example shown, two clamping arms 40 are provided in association with each transport frame 5, in particular, associated with each tip saddle 52 and tip saddle assembly 50. A clamping arm 40 may be opened to allow insertion or removal of a blade 1 into or from a tip frame 20. A clamping arm 40 may be closed to keep the blade in place. In aspects of the invention, a first and a second clamping arm 40 may be provided mounted at a proximal end thereof to a single tip saddle assembly 50, preferably at a hinge point. Preferably, In FIG. 3, a proximal clamp arm 40 is shown closed, while a distal clamp arm 40 is shown open for illustrative purposes. A raising and lowering apparatus may be provided for operating the clamping arms 40. The provision of more than one clamping arm 40 at a tip saddle assembly may allow for larger blades to be effectively clamped in a tip saddle assembly 50 while at the same time keeping each clamping arm 40 down to a size and weight such as to allow manual operation by an operator, preferably using tools such as hand tools and preferably not using power or powered tools.

FIG. 1 illustrates a stack of blades 1 with their root portions 8 in a root transport frame 10 and their blade mid- or tip portion 7 in a tip transport frame 20. The blades are shown lying substantially horizontally with their chordwise extent at a mid-portion 7 thereof also directed in a generally horizontal direction. In the embodiment illustrated, the free end of a closed clamping arm 40 reaches across the blade longitudinal main axis and extends approximately half way across the chordwise extent of the blade in the tip saddle assembly 50. An operator in an operating position 24 on a working platform in the tip transport frame 20 is able to reach all the relevant controls for installing or releasing a blade 1 into or from the frame.

As shown in FIG. 4, a root saddle assembly 80 may be provided in a root frame 10 of a frame pair. The root saddle assembly 80 is in particular preferably connected to the root frame 10 in such a way that translation movement of the root saddle assembly 80 relative to the root frame 10 is excluded.

A root saddle 82 may be configured with a support surface shaped to conform to the shape of a blade surface at its root. The root saddle 82 may thereby appropriately have an arcuate blade root support surface. The root saddle assembly 80 may include clamps or clamp attachments or other fittings for securely holding the blade root in the root saddle 80. These may be in the form of brace attachments and/or in the form of root restrainers.

In accordance with aspects of the invention, it is preferred for the root frame 10 of a pair to have an effective length $L_r$ greater than the effective length $L_t$ of the tip frame 20. In this context, the effective length of a frame 10, 20 may correspond to the distance between the most proximal surface of a proximal upright strut 72, 92 and the most distal surface of a distal upright strut 71, 91. Still preferably, the effective length $L_r$ of the root frame 10 of a frame pair may be at least twenty percent greater than the effective length $L_t$ of the tip frame 20. Still preferably, the effective length $L_r$ of the root frame 10 of a frame pair may be at least thirty percent greater than the effective length $L_t$ of the tip frame 20. The stability of a root frame 10 or root frame stack may thereby be further enhanced.

Preferably, frames 5 may be stacked atop each other by placing a foot 12 of a first frame A atop a shoulder 14 of a second frame B (see FIG. 12).

Figure 2:
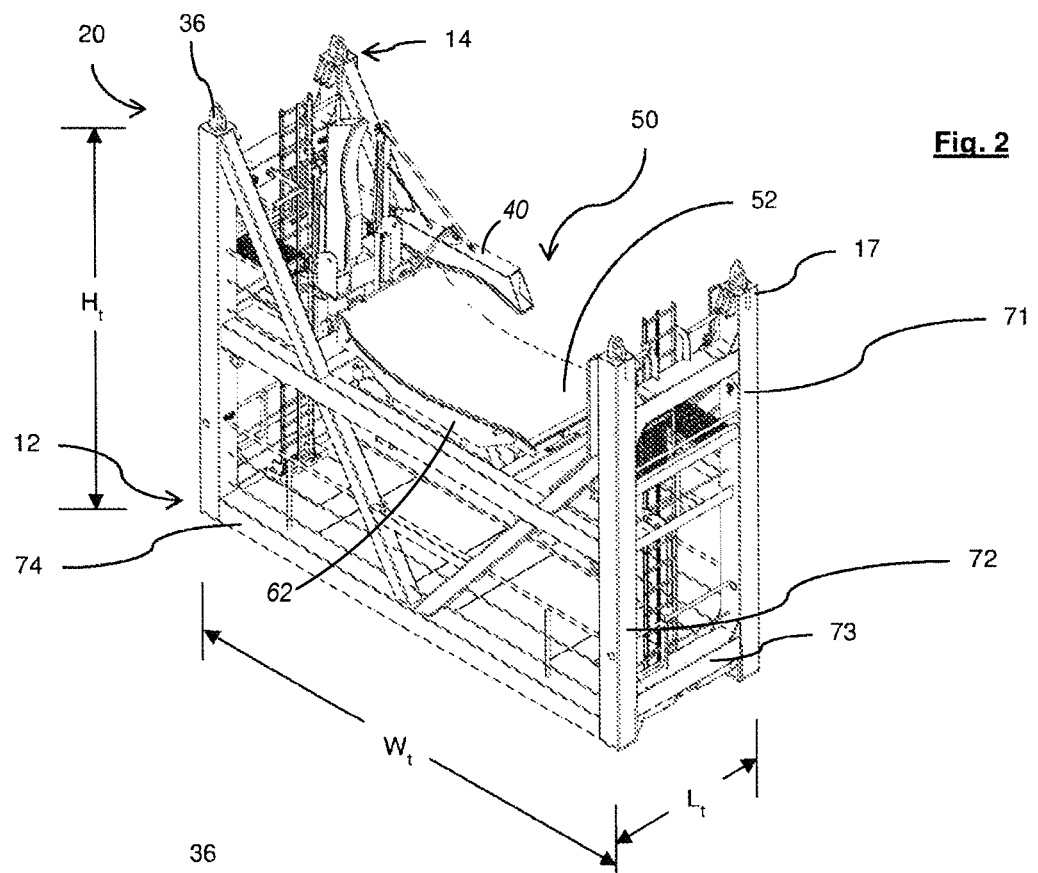
FIG. 2 shows a perspective view of a transport frame which is a tip frame.

As can be seen from FIG. 5a or 5b, a locating finger 36 may be provided preferably at each shoulder 14 of a tip and/or root transport frame 20, 10. The locating finger 36 may be elongate, extending in height h from said shoulder 14 to a truncated tip 68 having a small dimension in particular in relation to a recess 16 in a frame foot 12. A bevelled edge may further improve the locating properties of the locating finger 36 in a frame foot recess 16 or in any other recess in which a locating finger may be placed. Preferably each shoulder 14 may be provided with such a locating finger 36 as shown in FIGS. 2-4. With reference to FIG. 12, the locating finger 36 may be configured to easily locate itself in a recess 16 at a foot of a transport frame 5. In embodiments, and as can be seen from a review of FIG. 2 or 4, one locating finger may be longer than the others. With reference to FIGS. 5a and 5b, and also to FIG. 4, a first locating finger 36a, has a height h1 greater than the heights of the other three fingers 36b-d. According to aspects of the invention, one of the locating fingers 36 atop a shoulder 14 may have a maximum height h1. This contributes to ease of stacking of a second frame A over and with its foot 12 in engagement with a shoulder 14 of a first frame B. The tip 68 of finger 36a will, when a first frame is lowered over a second frame, reach into the relevant recess 16 without needing to be co-ordinated at the same time with other locating fingers 36 or recesses 16. It is thereby easier to correctly locate a frame 5 to be lowered in place than with all or more than one locating finger 36 having an equal length. Remaining locating fingers 36b-d may all be of a same height h or, as in another aspect of the invention, a second locating finger 36b, may have a height h2 less than the height h1 of a first locating finger 36a and greater than the height of further locating fingers 36c, 36d at the frame 5 (or root frame 10). In particular third and fourth locating fingers 36c and 36d may have a lower height h3, preferably being a minimum height at any frame shoulder 14. In use, the second highest locating finger 36b may facilitate final positioning of a first frame A to be stacked over a second frame B, unimpeded by remaining, shorter locating fingers 36c, 36d. As may be seen from FIG. 7, a similar method may be employed when lowering a lifting element 130 onto a frame for securing it prior to a lift. The method works especially well with a rigid lifting element such as a spreader or yoke (as illustrated). Preferably, each connecting piece 131 illustrated in FIG. 7 as a corner post of a yoke, may have a foot 133 capable of resting on a shoulder 14 of the frame 5 when the locating fingers 36 at said frame are inserted in the recesses 132 in the foot 133 of the connecting pieces 131 of the lifting element 130. FIG. 1 shows additional aspects of a lifting operation using a lifting element at the locating fingers 36 of a topmost transport frame 5 in a stack.

Also visible in FIGS. 5a and 5b is the optional, general tongue-shape of the locating finger 36 in that portion which extends above a shoulder 14. The preferred shape of the anchor portion 37 may also be generally tongue-shaped. While the top part $H_g$ of a locating finger 36 may have a width $W_g$ configured to fit within the circumference of a recess 16 at a blade frame foot 12, the anchor portion 37 may instead have a width which is configured to the dimensions of a transport frame upright strut, 71, 72, 91, 92. In embodiments, a locating finger 36 and its anchor portion 37 may be made from a single piece of material. In embodiments, the locating finger 36 and its anchor portion may be made from a single plate of material. In embodiments, the locating finger 36 and its anchor portion may have a substantially uniform thickness $T_g$. The term substantially uniform thickness in this context does not exclude minor elements of bevelling or perforations or other details, e.g. for interconnection purposes. In the example shown in FIG. 5a, a locating finger 36 and its anchor portion 37 may together have the general configuration of a single plate, i.e. preferably a flat, planar configuration. In aspects, as suggested in FIG. 5b or FIG. 13, a guide plate 36 and its anchor portion 37 may be generally tongue-shaped with a stepped shoulder portion between the anchor portion 37 and the guide plate portion 36. A locating finger 36 may be combined with a raised abutment 22 or may be implemented independently thereof. A locating finger 36 may be tongue-shaped and may have a generally truncated point. A locating finger 36 when combined with an abutment 22, may also provide some additional, limited lateral stability to a frame stack although this is not the finger's primary purpose. Preferably, a locating finger 36 may comprise a lifting point 28 capable of supporting the weight of a blade transport frame 5, in particular when two or more such locating fingers 36 are provided per blade frame 5. In the illustrated embodiments, a lifting point 28 is provided by way of a hole in a locating finger 36. The primary purpose of the lifting points 28 in the locating fingers 36 is to enable a blade frame 5 or a stack of blade frames to be picked up from above using a lifting element 130 which engages with the locating fingers 36. The arrangement according to aspects of the invention, for lifting a frame or, more particularly, a stack of frames using a lifting connector 130, although it engages with locating fingers 36 which are also useful during stacking, may preferably be separate from stacking connector arrangements for interconnecting frames. Aspects of and examples of a stacking connector arrangement are discussed below. This avoids the need for a lifting element in a lifting operation to additionally require a stacking connector. This is preferred because the secure engagement offered by a stacking connector arrangement may be aimed primarily at maintaining a secure, stacked configuration of blades 1 in blade frames 5 during transportation and also allowing stacked frames to hold together when being picked up as a stack by lifting equipment such as a crane. This can greatly speed up the process of loading onto a vessel or other transport platform, or unloading from the same. Moreover, the placement of lifting element 130 may be made considerably quicker by enabling its attachment to the locating fingers 36. Since the lifting of a blade frame or stack of blade frames does not generally impart lateral forces to the relevant frame, it is possible to lift even the considerable weight of a stack of blades using the locating fingers 36. Preferably, in embodiments, a locating finger 36 may be configured with an anchor 37 which extends inside the blade frame shoulder 14, below the level of the shoulder 14. This arrangement may give additional strength for a lift, especially of a stack of blades 1 and frames 5.

The present invention is mainly concerned with efficiently lifting wind turbine blade frames, in particular stacked blade frames containing blades. This task has been approached with a view to being as simple, efficient and non-invasive on the other transport frame design criteria as possible. In aspects therefore, the manner of interconnecting remaining frames in a stack may be important, although many different solutions are possible. Hence, the interconnection of adjacent frames, although discussed in this disclosure may be achieved in different ways than described below.

With reference to FIGS. 6 to 9, a lifting yoke 130 has a connecting piece 131 at each of its four corners. A connecting piece 131 may comprise a corner post 134. The connecting pieces may be fixed together in a frame construction. In the example shown, the frame construction may comprise lateral struts 128 and longitudinal struts 126. These may be respectively substantially parallel, thereby a lifting yoke frame may be generally rectangular. In particular, a rectangular frame may extend about a central region.

The yoke 130 is dimensioned and configured such that each connecting piece 131 is positioned to engage with a top shoulder 14 of a transport frame 5. The yoke 130 comprises easily operable locking elements for secure engagement with, and release from, transport frames 5. The yoke 130 is preferably constructed rigid and robust enough to withstand lifting heavy loads of in the region of fifty tons or more. Nevertheless, it is designed to be manually operable in most respects.

Each corner post 134 may comprise a housing 135 defining an interior region enclosing operative components of the connecting piece 131. Notably, the housing 135 may securely and supportingly enclose guide surfaces 127, preferably provided on guide plates 152 which generally define a locking space between them for snugly receiving a transport frame locating finger 36. A locking mechanism at a connecting piece 131 may in particular comprise a locking element 156 illustrated in the present example as a locking bolt inside a sleeve 163. Preferably, the locking element 156 is easily operable by an operator. In the case illustrated, a locking element 156 may be operated using a bolt handle 161. For added safety, the bolt handle 161 may run in grooves or slots in a bolt sleeve 163. The sleeve 163 may include longitudinal slots allowing a forward and retracting motion of the bolt, and also transverse slots, for blocking a forward or retraction motion of the same.

The yoke 130 is designed to allow, as simply and effectively as possible, operative, lifting connection with transport frames 5 at locating fingers 36. These fingers are provided with a lifting point 28. The corner posts 134 of the yoke 130 are therefore designed to simply, swiftly and firmly engage a load bearing locking element 156 with the relevant lifting transport frame lifting point 28.

This is achieved in the illustrated example by providing two guide surfaces 127 with locking apertures. The guide surfaces 127 may preferably be the surfaces of thick guide plates 152, configured to both receive and locate a locating finger 36 in a locking space therebetween, as well as to define a locking passage along a locking axis 158 which may pass therethrough and also through a lifting point 28 in the locating finger 36.

For increased effectiveness, the locking space between guide plates 152 may be configured with a movable reference surface. This may enable more precise location of a locating finger 36 within the locking space. In particular, the movable reference surface may be adjustable by means of an easily operable adjuster 151 and may abut with the locating finger 36. A change in position of the reference surface may thereby change the position of a locating finger 36 inside the locking space. In turn, the relative arrangement of locking passages through the guide plates 152 in relation to the lifting point 28 at a locating finger 36 may be shifted. In particular, an alignment between the lifting point 28, which may be a hole or passage, and the locking passages in the guide plates 152 may be improved, thereby improving the effectiveness and ease of use of the lifting yoke 130. In the illustrated embodiment, the reference surface may be the end of a threaded bolt. In other words, the adjuster 151 may, in embodiments, be a bolt 151 passed through a threaded plate fixed to the corner post housing 135. Preferably each corner post 134 may comprise an adjuster 151. Preferably, the adjusters 151 of laterally or longitudinally opposite corner posts 134 may act in opposition to each other. Hence, a push action by one adjuster 151 may result in a relative movement of a locating finger 35 against the action of an adjuster 151, at the laterally opposite corner post 134. In some cases, a tightening action on one adjuster 151 may result in a need to loosen an adjuster 151 at an opposite corner post 134. In this way, two-directional adjustment may be achieved using only "push" adjusters 151.

In order to easily position a yoke 130 on a transport frame, it is envisaged to initially apply an aperture 132 in a foot 133 thereof to a first locating finger 36 (36*a*) which is longer than the other three. The yoke 130 may loosely engage the first finger 136 allowing itself to be easily swung into alignment with the remaining three locating fingers 36 before being lowered into engagement with them all. Alternatively or additionally, a second locating finger 36 (36*b*) may be shorter than the first but longer than the remaining two (36*c*, 36*d*). In this case, the yoke 130, after engaging the first locating finger, may then readily be brought into engagement with the second of these before finally being positioned for engagement with the remaining two. Preferably the longest and second longest locating finger may be placed at diagonally opposite corners of a yoke frame. It is pointed out that the yoke 130 illustrated at FIG. 6, 7 or 9 is provided with additional locating means in the form of a downwardly depending skirt with a reference surface 157. This device is optional in the context of the invention and may not be required in the event of relying on the different lengths locating fingers 36 as described above. Hence, a frame without the depending reference surface 157 also falls inside the scope of the present invention.

Nevertheless, the depending reference surface 157 may be a useful aid to locating a lifting yoke 130 on a transport frame 5. In particular, the yoke 130 having one or more depending reference surface at a corner post 134, may be moved nearby a relevant transport frame 5 such that the reference surface abuts a flank, i.e. a side, of an upright strut of a transport frame 5, proximate a shoulder 14 thereof. The yoke 130 and a transport frame 5 may be configured such that this corresponds to a reference position in which the locating finger is aligned with both the aperture 133 of the foot 133 of a corner post 134 and with the locking space between two guide surfaces 127. From that position, the yoke may be simply lowered onto the transport frame shoulders so that a foot 133 of the yoke corner post 134 abuts and rests on a shoulder 14 of the transport frame 5. For added effectiveness the yoke 130 may be provided with more than one reference surface 157. In the illustrated embodiment, four reference surfaces 157 are provided, one at each corner post 134. In alternatives, there may be provided two or three reference surfaces 157. In the illustrated embodiment, reference surfaces 157 are positioned facing each other from opposite sides of the yoke 130. This may still further increase their precision.

The yoke 130 may be configured to be suspended from a sling-type lifting apparatus. In particular, the yoke 130 may be provided with lifting eyes 153 capable of receiving lifting tackle such as a shackle or such like. Suitable lifting tackle may comprise a lifting sling 138 with four arms attached to a central connector. In co-operation with this, there may preferably be provided a lifting eye 153 at each corner of the yoke 130, preferably atop a corner post 134. For added strength and resilience, the lifting eye 153 may be oriented in line with the pulling direction, during lifting, of a sling arm. Therefore, the lifting eye 153 may be received in or at an eye plate 155, preferably substantially planar and oriented in the pulling direction of a lifting sling arm. Hence, ordinarily, each eye plate 155 may be oriented generally towards a central region of the yoke 130.

In some cases, there may be uneven weight distribution around the blades 1 and frames 5 or around a stack of these. After all, wind turbine blades 1 generally have a more or less irregular shape. The effect of this may be that loads in a lifting sling 138 during lifting a blade or blade stack may be unevenly distributed and may lead to listing of a suspended load. This can be dangerous and can have unpredictable consequences, both for safety, and for the condition of a blade 1, which may suffer damage as a result of stresses during lifting at a wrong angle. To counter this, it is proposed to provide a lifting sling 138 with different length arms, so that the lifted load, i.e. blade, frames and yoke, always remains in the intended orientation during lifting, preferably substantially horizontal. An illustration of this is given in FIG. 10a (tip frame 20) and FIG. 10b (root frame 10), from which it can be seen that the respective resultant centres of gravity 129 do not lie centrally within the yoke frames. In particular, in FIG. 10a, the centre of gravity 129 is off-centre, closer to one lateral edge 128 than the other (distance b along the length $T_L$ of the frame>distance a) and off centre, closer to one longitudinal side 126 than the other (distance f along the width $T_w$ of the frame>distance e). Similarly, with reference to the root frame 10 shown in FIG. 10b, the centre of gravity 129 is off-centre, closer to one lateral edge 128 than the other (distance c along the length $T_R$ of the frame>distance d) and off-centre closer to one longitudinal side 126 than the other (distance g along the width $T_R$ of the frame>distance h). This may give rise to different lengths of the various arms of lifting slings, for lifting, and to different angular positions of eye plates 155 on the yokes 130. In particular, the acute angles t1 and t2 nearby a lateral edge 128 may be larger than the acute angles t3 and t4 nearby an opposite edge. Also, acute angle t2 at the lateral edge 128 may be larger than the acute angle t1 at the same edge on an opposite lateral side of the yoke 130. Similarly, acute angle t4 at the lateral edge 128 may be larger than the acute angle t3 at the same edge on an opposite lateral side of the yoke 130. Also with reference to FIG. 10b, the acute angles r1 and r2 nearby a lateral edge 128 may be smaller than the acute angles r3 and r4 nearby an opposite edge. Also, acute angle r2 at the lateral edge 128 may be smaller than the acute angle r1 at the same edge on an opposite lateral side of the yoke 130. Similarly, acute angle r4 at the lateral edge 128 may be smaller than the acute angle t3 at the same edge on an opposite lateral side of the yoke 130. The lifting sling arms may thereby be appropriately pre-compensated for keeping the lifting yoke horizontal even during lifting of an irregular load. This is illustrated in FIG. 11.

The lifting apparatus and method which has been described relates to the lifting between a yoke 130 and one or more transport frames 5. It is intended, as part of the described lifting apparatus and method, for the frames other than a topmost frame to be lifted using stacking connectors which interconnect frames for safe transportation. Nevertheless, it may be advantageous in connection with the present invention, to utilise locating fingers both for locating frames atop one another in a stack, and to use locating fingers as a lifting point during lifting of a frame or stack. Hence, a method and apparatus for securely interconnecting frames, also in the context of lifting, has been developed and is further described hereinafter with particular reference to FIGS. 12 and 13.

Therefore, in further aspects, remaining frames of a stack may be connected together using a stacking connector. In embodiments, a stacking connector may comprise a connector arm 142 at one frame 5 and a co-operating clamping claw 162 at an adjacent frame in a stack. Also visible in the tip frame 20 and root frame 10 illustrated in respective FIGS. 3 and 4 is a stacking connector arrangement in the form of a retractable arm assembly 140 positioned, according to the illustrated embodiment, at a corner 17 of a frame, in particular at a bottom portion 75, 95 of the respective frame. Also visible in these figures is a clamping claw arrangement 160 positioned, according to the illustrated embodiment, at a corner 17 of a frame, in particular at a top portion 76, 96 of the respective frame. This clamping claw arrangement 160 also forms part of the said stacking connector. The positions of these elements, notably the connector arm arrangement 140 and the clamping claw arrangement 160 may be inverted, namely a retractable arm arrangement 140 may be positioned at a top portion 76, 96 of the respective frame, whereas the clamping claw arrangement 160 may be positioned at a bottom portion 75, 95 of the respective frame. In embodiments frame 5, may have some retractable arm arrangement at top portions 76, 96 thereof and some at bottom portions 75, 95 thereof. Correspondingly, in these embodiments frame 5, may have some clamping claw assemblies at top portions 76, 96 thereof and some at bottom portions 75, 95 thereof. Ideally, top and bottom portions of upright frame struts may be provided with corresponding claw or arm arrangements so that similar frames are engageably stackable.

FIG. 12 shows an example of how a connector arm arrangement 140 may be configured. The illustration shows a gang arrangement of three retractable arms 142, although only two said arms 42 are visible, all hinged about a hinge axis at a hinge body 150 and hingeably pivotable about hinge axis 148. In the example shown, the hinge axis may extend substantially parallel to transverse direction W of a blade 1 or frame 5. A retractable arm arrangement 140 may nevertheless include only a single arm 142 or two arms 142 or more than three. In FIG. 12 one arms 142 is shown in a retracted position thereof and one in an engagement position at a clamping claw arrangement 160. In the retracted position, arms 142 may be secured at a catch 146 fixed to a portion of a blade frame 5. Suitably, a catch 146, or a set thereof may be located at a transverse or longitudinally extending frame strut 74, 94, 73, 93. An arm 142 may extend along a longitudinal axis between a hinge point at one end and a connection portion at the other. In the example shown an arm may have a tensioner 144 for secure engagement with a clamping claw 162 and preferably for imparting tension force to a connection between adjacent frames, tending to pull these securely together. In the example shown a tensioner 144 may comprise a longitudinal bolt 147 which may pass threadably through push plate at a distal end of the arm 142. A rotation of the tension bolt 147 may thereby move the bolt in an engagement or release direction of the releasable arm 142. In the illustrated embodiment, the tensioner engages with the catch 146 to hold the arm 142 against the action of gravity, suspended in a substantially horizontal orientation. In order to prevent dislodging of the arm, for example under the action of shocks or vibrations, a counternut 149 may be provided and optionally also a locking nut 145. In a retracted position, there may be no need to apply considerable tension to the arms 142. Modest tension will suffice.

A connector arm 142 may comprise two longitudinally extending segments joined together at a hinge end and at a distal end. A hinge end thereof may include a hinge element which may be receivable in a hinge block. A distal end thereof may comprise a push plate which may serve to connect together said distal ends of the opposing blades of an arm 142. Alternatively, and arm may comprise a single strut with a passage therethrough. An arm 142 may thereby define a cavity accommodating a clamping claw 162 or a catch 146. In aspects, a catch 146 or a clamping claw 162 may be positioned between said two opposing segments in a respective engagement or retracted position of an arm 142. Thereby, a tensioner 144 acting on the push plate, in particular through the same, may securely abut against respectively a retaining surface of said catch 146 or against an anvil surface 164 (see also FIG. 13) of said clamping claw 162.

Conversely, at the opposite end of a same frame strut, and as illustrated in FIG. 12, there may be provided a clamping claw arrangement 160. In the example shown in FIG. 12, the arrangement 160 comprises a gang of claws 142 which in the case illustrated is three claws although only one is visible. These are configured to co-operate respectively with the three arms 142 of a retractable arm arrangement 140. In embodiments, a clamping claw arrangement 160 may include only one or two said claws 162 or more than three. As can be seen from FIG. 13, each clamping claw 162 preferably comprises a landing point or anvil 164 configured to co-operate with a tensioner 144 at a retractable arm 142. In embodiments, it may be envisaged to provide a tensioner 144 at a clamping claw 162, and a corresponding anvil 164 or landing point at a retractable arm 142. The clamping claws 162 of a clamping claw arrangement 160 are preferably especially shaped to engage with a tensioner 144 at a retractable arm and to provide secure engagement therewith while sustaining a high level of tension imparted by action of the tensioner 144.

FIG. 12 illustrates how adjacent frames in a stack may be securely interconnected for storage, transport, and also for lifting of a whole stack. A recess 16 in a frame foot 12 allows access from beneath the foot 12 into an interior region of a frame corner 17. The mode of operation of the arrangement is illustrated in FIG. 12, in which one connector arm 142 of an arm arrangement 140 is shown retracted while the other is shown engaged in a clamping claw arrangement 160. A first frame A is placed atop a second frame B such that the foot 12 of the first frame A rests on the shoulder 14 of the second frame B. This may be carried out while all connector arms 142 are in a retracted position, preferably at a respective catch 146. For added safety, a split pin or other locking element maybe passed through a catch 146 at a locking hole 141 therein to prevent accidental fallout from a retracted position. An operator may loosen the tightener 144 at a first arm 142 at a corner 17 said first frame A. It may be necessary first to loosen or remove locking or blocking elements such as any split pins or lock nuts 145. The arm 142 may then be swung about its hinge axis 148 in the direction of arrow 90 into approximate engagement with a corresponding clamping claw 62 in a claw arrangement 160 at corner 17 of a the adjacent, second frame B. Tension may be applied to the tensioner 144, in this case comprising a threaded bolt 147 passing through a push plate of the retractable arm 142. An operator may do this by simply turning the bolt 147 in a tightening direction, preferably using only hand tools. Access by an operator to the relevant part of a frame 5 may be ensured by providing appropriate platforms. Tightening may best be carried out by first loosening the counternut 149 and loosening any other locking nut 145. The tension bolt 147 may be tightened fully against the clamping claw 162, preferably against an anvil 164 thereof and preferably engaging with a recess 165 therein. Thereafter, a counternut 149 may be tightened and a lock nut 145 may optionally also be applied. Thereafter, a second and any subsequent connector arm 142 may be swung into engagement in the same way. Optionally, the steps of securing a tightener 144 using a counternut 149 and/or a lock nut 145 may be left until all the arms 142 at a relevant arrangement 140 have been tensioned in position at a corresponding clamping claw 162. An operator may thereby carry out successive re-tightening and balancing operations to ensure that a high level of tension is applied at each arm 142 and preferably that the level of tension at each arm is approximately equal. A torque wrench may be used. In any case, the operation is complete when all relevant arms 142 at each arm arrangement 140 in a set of stacked frames are connected, tightened and secured. In this condition, the frames may be transported by any suitable means with, preferably, a reduced amount of lashing by virtue of the enhanced tension connection between adjacent frames in a stack.

In additional aspects, as illustrated in FIG. 13 or in FIGS. 5a and 5b, there may be provided a raised abutment 22 atop one or more shoulders 14 of a transport frame 5. The raised abutment 22 may co-operate with a recess 16 in a frame foot 12. This arrangement may provide additional stability when the frames 5 are stacked. In the illustrated embodiments, the abutment 22 has a circular shape although any shape will be usable, provided that the abutment 22 and recess 16 are complementary. A locating fit between the abutment 22 and a recess 16 may be sufficient although it may be preferred, in embodiments, to provide a close tolerance fit in order to assist in resisting shear stresses incident on the frames during transport.

The term retractable, applied to arms 142 of a stacking connector, does not necessarily imply retractability in a vertical direction although this is one possibility and has been illustrated. Preferably the term retractable implies the capability to be moved between an engagement position and a retracted, non-engagement position in relation to a catch such as clamping claw 162. FIG. 1 illustrates figuratively a lifting operation of a stack of blades 1 in their root and tip frame pairs 10, 20. The stacked frames are connected using retractable arm arrangements 140 as described herein, while the topmost frame of each stack is quickly and easily connected to a lifting element 130, shown as a yoke, by means of locating fingers 36 atop each shoulder of each tip and root frame 20, 10.

The examples illustrated herein show a variety of optional features not all of which need to be combined together in the context of the invention. On the other hand, all and any recited features may be combined together unless prevented by the laws of physics or unless manifestly impossible for another reason.

The invention claimed is:

1. An assembly for lifting a wind turbine blade comprising:
   a wind turbine blade transport frame, said frame having a longitudinal, lateral and upright extent, and comprising four upright frame struts which together define a generally cuboid internal space having a said longitudinal extent between two pairs of said upright struts,
   wherein said frame is configured for transporting a root end or tip portion of a longitudinally extending wind turbine blade, said frame being stackable with similar frames, said frame having four top shoulders and four feet, said feet of said frame being conformed to be stackable on corresponding said shoulders of another similar frame,
   wherein each said shoulder is provided with a locating finger, each said finger having a height above said shoulder, and wherein each said foot is provided with a recess conformed to receive a said locating finger, and
   wherein each said finger is provided with a lifting aperture configured as a load bearing lifting point for lifting said frame or a stack of said frames; and
   a lifting yoke configured for connecting to, and lifting, a wind turbine blade transport frame, said yoke being generally rectangular and comprising four corner posts connected by struts;
   each corner post being configured for internally receiving therein an upwardly oriented locating finger atop a shoulder of said transport frame; said corner post having a housing enclosing an internal space and extending between a lower foot face and a top; said corner post having, at said lower foot face, an aperture dimensioned to receive a said locating finger into said internal space; said corner post further comprising guide surfaces enclosed within said housing and spaced apart to define a locking space and configured to snugly receive a said locating finger; each guide surface comprising a locking aperture; wherein a movable locking element is configured to engage both said locking apertures to thereby bridge said locking space;
   said locking element being configured to engage a lifting point at said locating finger;
   said movable locking element constituting the primary lifting element of said lifting yoke.

2. The lifting yoke according to claim 1, said locking space further including an adjustably movable reference surface therein, configured to abut with said locating finger.

3. The lifting yoke according to claim 1, further comprising a lifting sling having four centrally connected branches, each one being releasably attachable to a respective said corner post, each said branch having an effective length between said central connection and a corner post connector; and wherein two said branches have a shorter effective length than the other two.

4. A method of lifting a wind turbine blade transport frame by means of a lifting yoke, the method comprising:
   providing said wind turbine blade transport frame, said frame having a longitudinal, lateral and upright extent, and comprising four upright frame struts which together define a generally cuboid internal space having a said longitudinal extent between two pairs of said upright struts,
   wherein said frame is configured for transporting a root end or tip portion of a longitudinally extending wind turbine blade, said frame being stackable with similar frames, said frame having four top shoulders and four feet, said feet of said frame being conformed to be stackable on corresponding said shoulders of another similar frame,
   wherein each said shoulder is provided with a locating finger, each said finger having a height above said shoulder, and wherein each said foot is provided with a recess conformed to receive a said locating finger, and
   wherein each said finger is provided with a lifting aperture configured as a load bearing lifting point for lifting a said frame or a stack of said frames;
   providing said lifting yoke, wherein said lifting yoke is generally rectangular and comprises:
     four corner posts connected by struts, wherein each corner post is configured to internally receive therein a locating finger, wherein said corner post comprises:
     a housing enclosing an internal space and extending between a lower foot face and a top, wherein at said lower foot face, an aperture dimensioned to receive a said locating finger into said internal space; and
     guide surfaces enclosed within said housing and spaced apart to define a locking space and configured to snugly receive a said locating finger, wherein each guide surface comprises: a locking aperture, wherein a movable locking element is configured to engage both said locking apertures to thereby bridge said locking space, wherein said locking element being configured to engage a lifting point at said locating finger, and wherein said movable locking element constituting the primary lifting element of said lifting yoke;
   aligning said four corner posts with said locating fingers;
   receiving each said locating finger within said locking space in a respective said corner post;
   actuating respective said locking mechanisms to engage said locating fingers through respective said lifting apertures; and
   lifting a first said frame by means of said lifting yoke suspended from a lifting apparatus.

5. The method according to claim 4, further including lifting a stack of said frames by suspending a second or third or more said frame below said first frame, each said frame being suspended from the one immediately above it.

6. The method according to claim 5, each said transport frame further comprising a retractable arm assembly proximate one or more said top or bottom corner thereof; and further comprising, proximate at least one said top or bottom corner thereof, a clamping claw arrangement;
   said retractable arm assembly fixingly engaging a corresponding said claw arrangement at an adjacent frame in said stack; and wherein said second or third or more frames below said first frame are each suspended from the frame immediately above by said retractable arm and clamping claw arrangement.

7. The method according to claim 4, further including aligning said locking apertures in said guide surfaces with said lifting aperture in said locating finger by adjusting the position of a movable reference surface in said locking space.

8. The method according to claim 4, further including aligning said corner posts with said locating fingers of a transport frame by first bringing a reference surface depending from a said corner post into engagement with a flank of a said shoulder of said transport frame.

9. A lifting yoke comprising:
four corner posts connected by struts in a generally rectangular arrangement, wherein each corner post is configured to internally receive therein a locating finger, and wherein said corner post comprises:
a housing enclosing an internal space and extending between a lower foot face and a top, wherein at said lower foot face is located an aperture dimensioned to receive said locating finger into said internal space; and
a plurality of guide surfaces enclosed within said housing, spaced apart to define a locking space, and configured to snugly receive said locating finger therein, wherein each guide surface comprises a locking aperture, wherein a movable locking element is configured to engage said locking apertures to thereby bridge said locking space, wherein said locking element is configured to engage a lifting point at said locating finger, and wherein said movable locking element constitutes the primary lifting element of said lifting yoke.

10. The lifting yoke according to claim 9, wherein said struts comprise two respectively lengthways and two lateral struts.

11. The lifting yoke according to claim 9, wherein a portion of said movable locking element is received in a passage which extends outside said internal space.

12. The lifting yoke according to claim 9, wherein said movable locking element is reciprocably movable between a locking and a release position by an operator.

13. The lifting yoke according to claim 9, wherein one or more of said corner posts further includes a locating skirt downwardly dependent therefrom and configured with a reference surface designed to rest against a flank.

14. The lifting yoke according to claim 13, wherein said reference surface of said locating skirt has a lowermost flared portion.

15. The lifting yoke according to claim 9, wherein said top of each said corner post comprises a lifting eye in a substantially planar eye plate; wherein each said eye plate lies in a respective plane, an imaginary, common intersection of all of which coincides with a central region within said yoke.

16. The lifting yoke according to claim 15, wherein each said eye plate lies in a respective plane, an imaginary, common intersection of all of which coincides with an off-centre location within a central region within said yoke.

17. The lifting yoke according to claim 16, wherein said off-centre location within a central region within said yoke lies closer to one laterally extending side of said rectangular frame than to the other.

18. The lifting yoke according to claim 9, said locking space further including an adjustably movable reference surface therein, configured to abut with said locating finger.

19. The lifting yoke according to claim 9, further comprising a lifting sling having four centrally connected branches, each one being releasably attachable to a respective said corner post, each said branch having an effective length between said central connection and a corner post connector; and wherein two said branches have a shorter effective length than the other two.

20. The lifting yoke according to claim 9, wherein said locking element is a bolt inside a sleeve and wherein said bolt is operable using a bolt handle running in grooves or slots in said sleeve.

* * * * *